April 23, 1963  G. F. DALES  3,087,033
SNAP THERMOSTAT
Filed May 4, 1959 2 Sheets-Sheet 1

INVENTOR.
GEORGE FRANKLIN DALES
BY
ATTORNEY

April 23, 1963

G. F. DALES 3,087,033

SNAP THERMOSTAT

Filed May 4, 1959

INVENTOR
GEORGE F DALES
BY

ATTORNEY

United States Patent Office 3,087,033
Patented Apr. 23, 1963

3,087,033
SNAP THERMOSTAT
George Franklin Dales, 253 Castle Blvd., Akron, Ohio
Filed May 4, 1959, Ser. No. 810,669
19 Claims. (Cl. 200—138)

This invention relates to a snap thermostat. It pertains more particularly to the small type of thermostat the casing of which is made from a tube no more than about one-quarter or three-eighth inch in diameter, and an inch or two in length.

Snap thermostats are in demand for several reasons. The speed with which they make and break contact is desirable. This may be the only consideration. On the other hand, it is sometimes desirable that the thermostat be designed so that it may be reset manually. Mechanical means may be provided for automatically resetting the thermostat.

The snap thermostat of this invention includes an electrode which combines a bimetallic element and a spring conductor, the contact button being located on the spring conductor. The spring conductor is connected to the bimetallic element at two spaced locations, and it is slightly bowed between these two locations. It can be convexly bowed, or concavely bowed, and a bow in either direction may be changed to a bow in the opposite direction by merely pressing the conductor until it has passed the midpoint between the two bowed positions, whereupon it snaps from a bow in one direction to a bow in the other direction.

The contact button is positioned on the spring conductor so that it is snapped into and out of contact with another contact button of the thermostat when the spring conductor is snapped from one bowed position to the other bowed position. This will be more fully explained in what follows, where the construction of several different models of this type of thermostat and their operation are discussed in connection with the drawings.

In the drawings—

Figure 11:
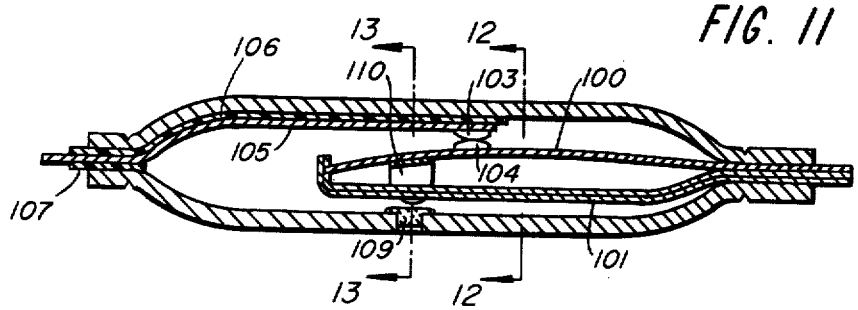
FIG. 11 is a section through a further modification in which the casing is not insulated from the bimetallic element and its conductor.
Figure 12:
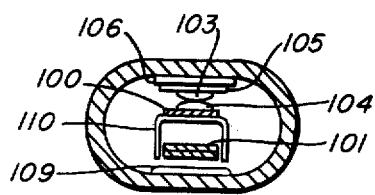
Figure 13:
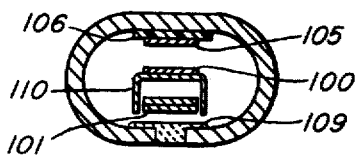
Figure 14:
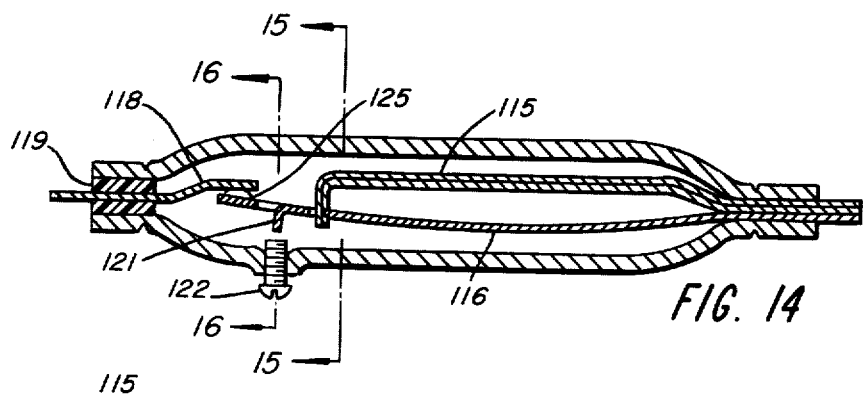
Figure 15:
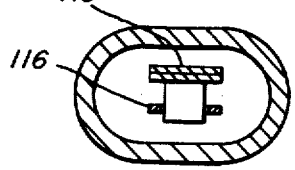
Figure 16:
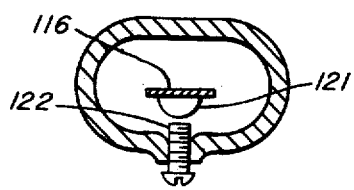

FIGS. 12 and 13 are sections through the thermostat of FIG. 11 on the lines 12—12 and 13—13 of FIG. 11;

FIG. 14 is a section through another modification in which the casing is not insulated from the bimetallic element and its conductor; and FIGS. 15 and 16 are sections on the lines 15—15 and 16—16 of FIG. 14.

The casing of the thermostat is made from tubing. Where the case is conductive and one of the contact buttons is embedded in the casing, the button may or may not be insulated from the casing. If the casing is non-conductive, it may be made of plastic or any other non-conductive material. In FIGURES 1-4 a thermostat is shown which is made from a conductive casing 1 such as aluminum or the like, and the button 2 is in conductive relation with the casing.

Figure 1:
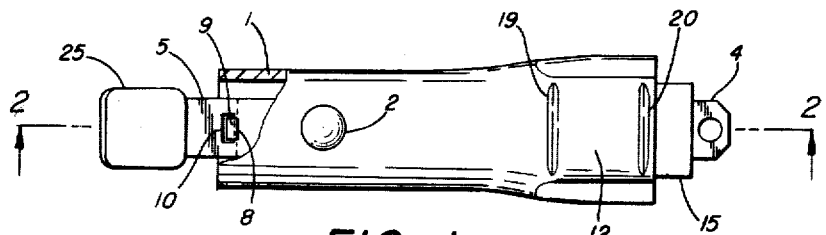
FIG. 1 is a top view of a thermostat, partly broken away to show its interior construction.
Figures 2, 3, 4:
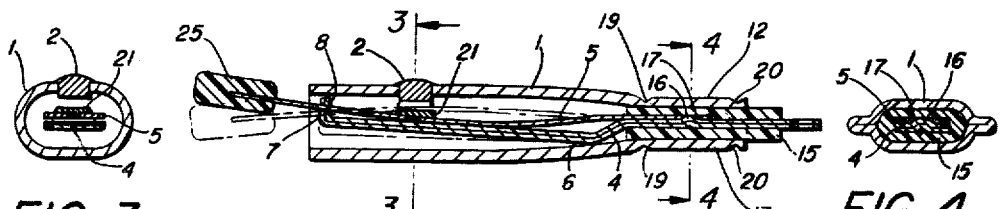
FIG. 2 is a vertical section on the line 2—2 of FIG. 1.
FIG. 3 is a vertical section on the line 3—3 of FIG. 2, through the contact buttons.
FIG. 4 is a section on the line 4—4 of FIG. 2, through the end of the thermostat.

The shape of the bimetallic element 4 may be varied. The spring conductor 5 is connected with it at two spaced points and FIGURE 2 shows this conductor bowed toward the bimetallic element in full lines, and bowed away from it in dotted lines. Because the conductor must be bowed toward the bimetallic element, at times, the bimetallic element is dished at 6, by bending the inner end of the electrode 7 up. This end is notched at 8 to engage the edge 9 of the hole 10 in the spring conductor. This edge is nearest the squeezed end of the thermostat. In this squeezed end of the thermostat the top 12 and bottom 13 of the casing are squeezed against the insulation 15 which surrounds the bimetallic element 4 and the end of the spring conductor 5 where it is connected to the bimetallic electrode.

The spring conductor can be connected to the bimetallic element in any one of a number of ways. FIGURE 2 shows that end of the bimetallic element which is within the insulation formed with a slight projection 16 which extends up into a small hole 17 in the spring conductor. In addition, the spring conductor is soldered to the bimetallic element. The interlocking of the projection 16 in the opening 17 prevents longitudinal displacement of the spring conductor with respect to the bimetallic element. Other suitable means of joining the spring conductor and bimetallic element may be used. This connection of the spring conductor with the bimetallic element is shown as being within the insulation 15 but the position of this connection is unimportant, and it may be in the interior of the thermostat.

The squeezed end of the thermostat is staked at 19 and 20. The thermostat is calibrated by bending and the stakes 19 facilitate bending the end of the thermostat so as to adjust the position of the contact button 21 on the spring conductor with respect to the contact button 2 which is located within the casing.

The length of the spring conductor between the two points at which it is connected with the bimetallic element is slightly greater than the actual distance between these two points and the spring conductor is therefore bowed between these two points. If pressure is applied to the bow in either direction so as to move it beyond its midpoint, it snaps to a bow in the opposite direction.

The bimetallic element bends toward or away from the contact points on heating or cooling, depending upon which side of the bimetallic element has the greatest co-efficient of thermal expansion. Assuming that the bimetallic element bends toward the contact point 2 when the thermostat becomes heated, the spring conductor is bowed concavely in the normal operation of the equipment and the contact button 21 is pressed against the button 2. As heat is applied and the bimetallic element bends toward the contact button 2, the spring conductor tends to flatten out. As the bending of the bimetallic element continues, the spring conductor passes the midpoint between its two bowed positions and snaps to the position shown in full lines in FIGURE 2. This breaks the contact between the two buttons 2 and 21.

The free end of the spring conductor need not extend beyond the end of the thermostat. After the thermostat has cooled, slight pressure on the free end in the direction of the bottom of the casing causes the spring conductor to snap back convexly, bringing the two buttons into contact again. However, in the illustration, the spring conductor extends beyond the end of the thermostat and is provided with a pressure element 25 which may be a button of resin or any other substance, preferably non-conductive, and usually of bright color so that it calls attention to itself. When the condition which has caused the buttons 2 and 21 to separate has been corrected, the operator who has made the correction presses the element 25 causing the spring conductor to snap to a concave bow, bringing the button 21 back into contact with the button 2, whereby the circuit is again completed and normal operation proceeds.

Figure 5:
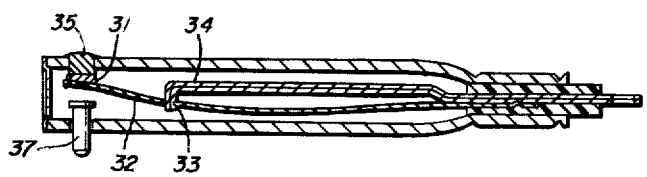
FIG. 5 is a longitudinal section through a modified form of thermostat.

FIGURE 5 shows a modification of the design in which the contact button 31 on the spring conductor is located beyond the catch 33 in the bent end of the bimetallic element 34 instead of being located on the other side of it. This button 31 makes and breaks contact with the button 35 in the casing. When the end of the electrode has been snapped away from the button 35, and it is desired to re-establish the circuit, instead of applying pressure directly to the end of the spring conductor, it is applied to the push button 37 which is slidably mounted in the casing. By pushing the end of the spring conductor past the midpoint of the two bowed positions, the button 31 is snapped back into contact with the button 35. The push button 37 is shown quite diagrammatically. Spring means may be utilized to maintain it out of operative relation except when pressure is applied to it. Alternatively it may be actuated by any suitable means.

Figure 6:
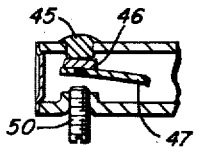
FIG. 6 is a view of an end of a further modification of the thermostat.

Instead of a push button which is adapted for manual operation, as illustrated in FIGURE 5, FIGURE 6 illustrates an arrangement designed for automatic resetting of the thermostat. The thermostat is of the same general design as shown in FIGURE 5, the spring conductor and bimetallic element being identical with those there shown. The button 45 is identical with the button 35 of FIGURE 5. FIGURE 6 shows the button 46 on the spring conductor 47 in contact with the button 45. The non-conductive setscrew 50 is adjusted to such a position that when the spring element snaps from the concave position shown in FIGURE 5 to the convex position in which the buttons 45 and 46 are separated, its end will touch or approach closely to the inner end of the setscrew. The setscrew 50 may be of ceramic composition or it may be of insulated metal. When the buttons are separated and the current ceases to flow, the bimetallic element bends back to its previous position, bringing the end of the spring conductor and the end of the setscrew into contact and then applying pressure between them. As the bending increases, the pressure increases until the spring conductor snaps back to the concavely bowed position, again bringing the button 46 into contact with the button 45.

Figure 7:
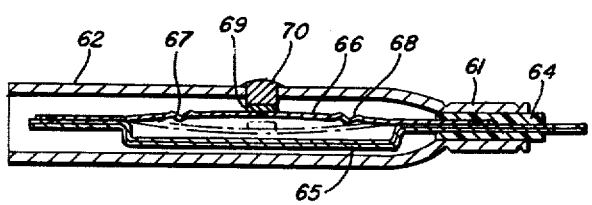
FIG. 7 is a longitudinal section through an alternative type of thermostat.

FIGURE 7 shows another modification designed for automatic resetting. The end 61 of the thermostat 62 is squeezed against the insulation 64. The bimetallic element 65 has both ends of the spring conductor 66 fastened to it by any suitable means, as by soldering. One end of the bimetallic element and spring conductor are held in the insulation.

The spring conductor is rippled at 67 and 68 on both sides of the contact button 69. Contact button 70 is mounted in the wall of the casing. As the bimetallic element flexes toward the button 70 when some unsatisfactory temperature condition has arisen, the spring element tends to be bowed concavely, and eventually snaps from the concavely bowed position (shown in full lines) to the convexly bowed position (shown in dot-dash lines). The contact buttons 69 and 70 are thus separated and the equipment will be out of commission until the defect causing the undesirable temperature condition has been corrected. The thermostat is so constructed that it is best to dispose of it once it has been used, although means can be provided for resetting it. For instance, a button or the like may be attached to the bottom side of the spring element to contact the bimetallic element 65 when the spring element is flexed to the position shown in dotted lines in FIG. 7. This button would limit the amount the spring element would flex downwardly, and as the bimetallic element returned to its original position by change in temperature, the spring element would flex back and bring the conducting elements 69 and 70 into contact again.

Figures 8, 9:
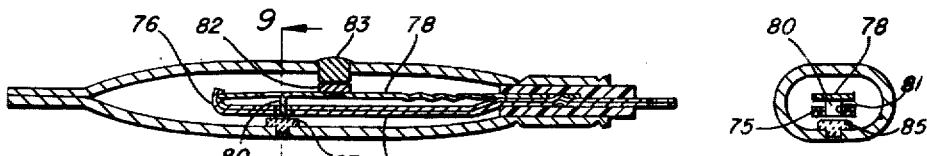
FIG. 8 is a longitudinal section through another form of thermostat.
FIG. 9 is a section on the line 9—9 of FIG. 8.

FIGURES 8 and 9 show a different type of automatically resettable thermostat. In general, the construction it the same as that shown in FIGURE 7, without the resettable means, except that the end of the bimetallic element 75 is turned up at 76 and the end of the spring conductor 78 is engaged in a notch in this turned-up end.

The ear 80 is cut from the spring conductor and turned down through a small opening 81 (FIGURE 9) in the bimetallic element. The bimetallic element 75 bends toward the top of the casing as the temperature rises. This brings the button 82 on the convexly bowed spring conductor 78 into contact with the button 83 in the casing.

As the heating continues, the pressure of the spring electrode 78 against the button 83 causes it to snap to a concavely bowed position, breaking the contact. This breaks the circuit and the temperature drops, causing the bimetallic element to straighten out or bend downwardly. Eventually the end of the ear 80 is brought into pressure contact with insulated button 85 in the casing (or the bottom of the casing if insulated). As the downward movement continues, the pressure on the ear 80 causes the electrode 78 to snap back to the convexly bowed position, again bringing the buttons 82 and 83 into contact. This is repeated.

Figure 10:
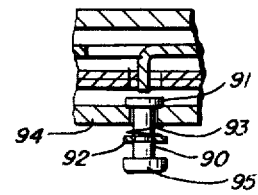
FIG. 10 is a detail in section of a modification of FIG. 8.

FIGURE 10 is a detail of a modification of the thermostat shown in FIGS. 8 and 9 in which the thermostat is manually resettable. The button 85 is replaced by the plunger 90, the head 91 of which performs the same function as the button 85 of FIGS. 8 and 9. Means 92 is rigidly attached to the plunger 90, and the spring 93 between this means and the casing 94 tends to keep the head 91 seated against the inner surface of the casing. To reset the thermostat pressure is applied to the outside head 95.

The stop 80 may be an ear bent down from the center or one side of the spring conductor. Alternatively it may be a separate unit conductively or non-conductively adhered to the spring conductor. The result is accomplished by a stop affixed to the bimetallic element to limit the movement of the spring element as discussed in connection with FIG. 7.

That metal of the bimetallic element which has the greatest coefficient of expansion, can be located toward or away from the spring electrode, and this determines whether the ear extends toward or through it (as just described) or whether it extends in the opposite direction to make contact with a button or the top of the casing.

One end of the spring conductor 100 in the thermostat of FIG. 11 is caught in a notch in the bent-up end of the bimetallic electrode 101. The opposite ends of these elements are held together as the end of the casing of the thermostat is squeezed against them. The button 103 on conductor 100 makes and breaks contact with the button 104 on the other electrode 105. This electrode is insulated from the casing by the insulation 106 which may, for example, be a lacquer coating applied either to the electrode or the casing. The electrode 105 is preferably of spring metal so that at all times it hugs the inner surface of the casing, although the insulation may be of an adhesive nature which holds the electrode against the casing. This electrode 106 is surrounded by any suitable insulation 107 (such as a braided glass fiber sleeve or the like) where it is squeezed in the opposite end of the casing.

This thermostat (FIGS. 11–13) resets itself. As the bimetal 101 is heated (or cooled) it bends so as to bring the button 103 into contact with the button 104. The pressure of this contact increases until the conductor 100 snaps from being bowed away from the bimetal, to being bowed toward the bimetal. The contact is thus quickly broken, and the thermostat cools off. As it cools, the bimetal bends toward the insulated button or contact plate 109. Eventually it cools sufficiently to bring the U-shaped contact member or ear 110 into contact with the plate 109 with sufficient pressure to cause the conductor 100 to snap back to a bow such as shown in FIG. 11, bringing the buttons 103 and 104 into contact, thereby re-establishing the heating circuit.

FIGURE 11 shows the buttons 103 and 104 in contact, so that the circuit is closed and current is flowing. The buttons must always be in contact when the conductor 100 is bowed convexly. When the thermostat is heated sufficiently, the pressure of the button 103 against the button 104 becomes so great that the conductor snaps to the convexly bowed position, the buttons 103 and 104 separate, and the thermostat cools off. The element 110 approaches button 109. They come in contact, and eventually the pressure is sufficient to snap the conductor 100 to the convexly bowed position, bringing the buttons 103 and 104 into contact again.

In an alternative structure, the element 110 is insulated from the conductor 100 and bears directly against the casing of the electrode to snap the thermostat.

In a further modification the conductor 105, insulation 106 and button 103 are replaced by an insulating button formed in the casing, such as the button 109 (FIGS. 11-13) or it may be made adjustable by the use of an insulating setscrew threaded in the casing.

FIGURES 14-16 show another thermostat in which the bimetal 115 is not insulated from the casing of the thermostat. The bimetal 115 and conductor 116 are squeezed in one end of the casing, and the electrode 118 is squeezed in the other end of the casing and suitably insulated from it by insulation 119. The ear 121 on the conductor 116 automatically resets the thermostat on contacting the setscrew 122. The temperature at which the thermostat is reset is adjusted by changing the position of the setscrew in the casing. When the button 125 contacts the electrode 118 the circuit is closed and the temperature of the thermostat rises. This increases the pressure of the button 125 against the electrode, until eventually the conductor 116 snaps from a position convexly bowed with respect to the bimetal 115, to a concavely bowed position. This breaks the circuit and the thermostat cools off. As it cools, the ear 121 contacts the button 122 and eventually applies sufficient pressure to snap the conductor 116 back to its former convexly bowed position, bringing the button 125 again into contact with the electrode 118 and re-establishing the circuit.

The ear 121 may be considered a diagrammatic showing, because when formed from the conductor 116 it reduces the width of metal remaining to conduct current from the button 125 to the end of the electrode. Instead of cutting the ear 121 from the conductor 121, it may be a conductive button or other structure added to the conductor without reducing its effective width, such as the element 110 of FIGS. 11-13, for example.

Modifications may be made in the constructions shown and more particularly described. Thus various means may be utilized for holding the spring conductor in contact with the bimetallic element. The spring conductor may be rippled to make it more easily flexed or the ripples shown may be omitted. The casing may be made of different metals. The electrodes can be held in the casing in any suitable manner; the thermostat can be constructed so that the electrodes are not necessarily insulated from the casing. It is not necessary that one of the buttons be in the casing, but if it is not it should be held so firmly that the spring conductor is snapped when pressure is applied to it. Each of the thermostats shown may be used where it is actuated when either a maximum or minimum temperature is reached.

The invention is covered in the claims which follow.

What I claim is:

1. A thermostat which includes a tubular casing, a bimetallic element and a spring element, both of said elements being long and narrow with the first end of each squeezed in one end of the casing and the opposite ends thereof being engaged with one another, the portion of the casing so squeezed being capable of being bent for calibration of the thermostat, the bimetallic element being spaced from the spring element between said two positions of engagement, the distance between said two positions of engagement on the spring element being slightly greater than the actual distance between them whereby the spring element is bowed and is capable of being snapped from a convexly bowed position with respect to the bimetallic element to a concavely bowed position, and a contact button on the spring element spaced from both of said positions of engagement.

2. The thermostat of claim 1 in which the circuit is completed by means of a button therein with which the button on the spring element makes contact when the spring element is in one of its bowed positions.

3. The thermostat of claim 1 in which the circuit is completed by means of a button therein with which the button on the spring element makes contact when the spring element is convexly bowed, with means operatively connected with the spring element for manually moving it from the concavely bowed to the convexly bowed position.

4. The thermostat of claim 1 in which the circuit is completed by means of a button therein with which the button on the spring element makes contact when the spring element is convexly bowed, with means against which the spring element in the concavely bowed position is brought into contact by movement of the bimetallic element in the direction it moves after the circuit is broken, whereby the spring element is snapped to the convexly bowed position.

5. The thermostat of claim 1 in which the casing is live and in which the circuit is completed by means of a button in the casing.

6. The thermostat of claim 1 the casing of which is electrically conductive, said first end of the bimetallic element being insulated therefrom, there being a contact button in the casing contacted by the contact button on the spring element as it snaps from one bowed position to the other to complete the circuit.

7. The thermostat of claim 1 in which, the other end of the casing is open, and said opposite end of the spring element extends from said open end beyond said opposite end of the bimetallic element, with the bowed portion of the spring element being movable from one of said bowed positions to the other of said bowed positions by movement of said extended end of the spring element.

8. The thermostat of claim 1 in which the location at which the spring element is otherwise engaged with the bimetallic element is between the location at which it is squeezed in the casing and the location of the contact button.

9. The thermostat of claim 1 the casing of which is electrically conductive, and in one end of which the spring element and bimetallic element are squeezed in conductive contact, another electrode squeezed in the opposite end of the casing and insulated therefrom, with the button on the spring element adapted to make and break contact therewith.

10. The thermostat of claim 1 the casing of which is electrically conductive, and in one end of which the spring element and bimetallic element are squeezed in conductive contact with the contact button on a portion of the spring element between said two spaced positions, another electrode squeezed in the opposite end of the casing and insulated therefrom, said other electrode lying against the inner surface of the casing and insulated therefrom and having thereon a button with which the other contact button is adapted to make and break contact, there being reset means on the spring element which snaps the element from one bowed position to the other as the reset means is placed under strain as it moves toward the casing.

11. A snap thermostat having therein a switch assembly which is a combination of an elongated, bimetallic element with a catch at one end thereof and an elongated, electrically conductive spring element, the other end of said bimetallic element and one end of said spring element being held together in immovable contact with one another, the spring element being slightly bowed and having its other end engaged with said catch and adapted to be so engaged both while concavely bowed and while convexly bowed, and when so engaged and pushed from one of said bowed positions over half way toward the other of said bowed positions it is snapped to said other position, a contact supported in fixed relation to said ends of the bimetallic element and the spring element which are in immovable contact, and a contact button on one side of said spring element at a location spaced from its engagement with the catch and also spaced from said end of the spring element, which contact button is adapted to make contact with said first-mentioned contact, an ear projecting from the side of the spring element opposite the side carrying said contact button, and stop means engageable by said ear, said stop means being insulated from the bimetallic element and supported in fixed relation with respect to said ends of the bimetallic element and the spring element which are in immovable contact.

12. The thermostat of claim 8 in which the contact button is between said location on the spring element at which it is engaged with the catch and said location at which it is otherwise connected with the bimetallic element.

13. The thermostat of claim 11 which is automatically resettable and in which there is a hole through the bimetallic element and said projecting ear is adapted to engage said stop means by passing through said hole.

14. A thermostat which includes a tubular casing, a long narrow bimetallic element and a long narrow spring element with one end of the bimetallic element and the spring element in contact and squeezed in one end of the casing, said squeezed end being capable of bending for calibration of the thermostat, and the opposite ends of the bimetallic element and spring element held in non-sliding contact, the distance of the spring element between said two points of contact being slightly greater than the actual distance between them whereby the intervening span of the spring element is bowed and is adapted to be concavely bowed and convexly bowed and can be snapped from one of said bowed positions to the other, there being a contact button on the spring element spaced from said points of contact.

15. The thermostat of claim 14 in which there is means extending relatively vertically from the spring element, and means within the thermostat which said extending means is adapted to contact on movement of the bimetallic element whereby the spring element is snapped from one bowed position to the other bowed position.

16. The thermostat of claim 11 in which the casing is live and the spring element and bimetallic element are insulated from the casing and the means which the extending means is adapted to contact is an insulated means in the casing.

17. The thermostat of claim 15 in which the means which the extending means is adapted to contact, is means positioned rigidly with respect to the casing of the thermostat.

18. The thermostat of claim 15 in which there is a hole in the bimetallic element, and the extending means is an ear on the spring element and this ear extends through said hole, and the means which the extending means is adapted to contact is positioned rigidly with respect to the casing of the thermostat.

19. A thermostat comprising a tubular casing and having a switch assembly therein which is a combination of a long, narrow bimetallic element and a long, narrow spring element permanently connected therewith in superimposed position at two spaced positions, one end of the switch assembly at one of said positions being squeezed in one end of the thermostat, the thermostat being capable of being calibrated by bending said squeezed end, the distance between said two positions on the spring element being slightly greater than the actual distance between them whereby the spring electrode is bowed and is capable of being snapped from the convexly bowed position to the concavely bowed position, the bimetallic element being laterally spaced from the bowed portion of the spring element when in the convexly bowed position.

References Cited in the file of this patent

UNITED STATES PATENTS

| 1,731,903 | Mottlau | Oct. 15, 1929 |
| 1,784,450 | Klahan | Dec. 9, 1930 |
| 1,813,776 | Spencer | July 7, 1931 |
| 2,054,558 | Dederick | Sept. 15, 1936 |
| 2,497,397 | Dales | Feb. 14, 1950 |
| 2,815,417 | Lenoir | Dec. 3, 1957 |
| 2,878,343 | Dales | Mar. 17, 1959 |

FOREIGN PATENTS

| 8,229/27 | Australia | Apr. 17, 1928 |
| 428,874 | Great Britain | May 21, 1935 |

UNITED STATES PATENT OFFICE
CERTIFICATE OF CORRECTION

Patent No. 3,087,033

April 23, 1963

George Franklin Dales

It is hereby certified that error appears in the above numbered patent requiring correction and that the said Letters Patent should read as corrected below.

Column 4, line 7, for "it" read -- is --; column 7, line 33, for the claim reference numeral "8" read -- 11 --; column 8, line 9, for the claim reference numeral "11" read -- 15 --.

Signed and sealed this 1st day of October 1963.

(SEAL)
Attest:

ERNEST W. SWIDER
Attesting Officer

DAVID L. LADD
Commissioner of Patents